United States Patent
Yoshimoto et al.

(10) Patent No.: US 6,254,284 B1
(45) Date of Patent: Jul. 3, 2001

(54) OPTICAL PICKUP HAVING OPTICAL WAVEGUIDE DEVICE FIXED ON STEM WITH WEDGE-SHAPED DEVICE FIXING MEMBER INTERPOSED AND METHOD OF MANUFACTURING THE SAME

(75) Inventors: Akihito Yoshimoto, Yamatotakada; Yoshio Yoshida, Nara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/145,952

(22) Filed: Sep. 3, 1998

(30) Foreign Application Priority Data

Sep. 8, 1997 (JP) .................................................. 9-242324

(51) Int. Cl.⁷ .............................. G02B 6/00; G11B 7/135
(52) U.S. Cl. .......................................... 385/88; 369/44.12
(58) Field of Search .................................. 385/88, 89, 91, 385/92, 93, 94; 369/44.12, 44.11, 109, 110, 112

(56) References Cited

U.S. PATENT DOCUMENTS 5,481,515 * 1/1996 Kando et al. ..................... 369/44.12
5,781,676   7/1998 Okada ................................. 385/31

FOREIGN PATENT DOCUMENTS 196 44 973   5/1997 (DE) .
8-171747     7/1996 (JP) .

* cited by examiner

Primary Examiner—Frank G. Font
Assistant Examiner—Andrew H. Lee
(74) Attorney, Agent, or Firm—David G. Conlin; William J. Daley, Jr.; Dike, Bronstein, Roberts & Cushman (57) ABSTRACT

In manufacturing an optical pickup, an adhesive is applied between an optical waveguide device and a wedge-shaped device fixing member, and an adhesive is applied between the wedge-shaped device fixing member and a stem. After the position of the optical waveguide device is adjusted in three-dimensional directions of an optical axis direction and directions orthogonal to the optical axis by moving the wedge-shaped device fixing member, the optical waveguide device and the wedge-shaped device fixing member are fixed.

12 Claims, 8 Drawing Sheets

OPTICAL PICKUP HAVING OPTICAL WAVEGUIDE DEVICE FIXED ON STEM WITH WEDGE-SHAPED DEVICE FIXING MEMBER INTERPOSED AND METHOD OF MANUFACTURING THE SAME

BACKGROUND OF THE INVENTION

1. Field of the Invention

The present invention relates to an optical pickup used in an optical recording and reproducing apparatus for recording and reproducing of an optical recording medium such as a magneto-optical disk and a method of manufacturing the same. More specifically, the present invention relates to an optical pickup allowing easy and highly-precise positional adjustment of an optical waveguide device and a method of manufacturing the same.

2. Description of the Background Art

When a signal from a magneto-optical disk is to be detected by an optical pickup, a beam from a semiconductor laser is generally directed to the magneto-optical disk. The beam is reflected and split into a beam for detecting a servo error signal and a beam for detecting a magneto-optical signal, and these beams are used for their respective purposes.

Figure 1:
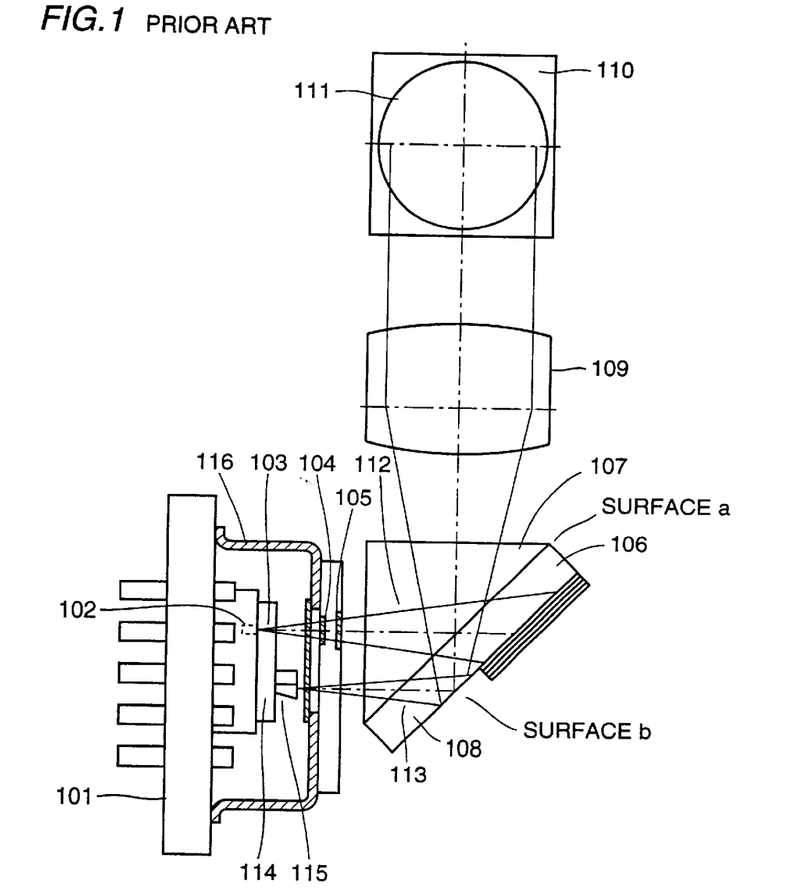
FIG. 1 is a plan view of a conventional optical pickup.

FIG. 1 is a plan view of an optical pickup employing an optical waveguide for a magneto-optical disk disclosed in Japanese Patent Laying-Open No. 8-171747, as an example of a conventional optical pickup and its optical system.

A beam 103 emitted from a semiconductor laser 102 fixed on a stem 101 is divided into a main beam and a tracking beam by a grating 104 as a diffraction grating. The beam passes through a hologram 105 and enters a beam splitter 108 formed by adhering a plate glass 106 and a prism 107. The entered incident beam is reflected by a mirror at an interface (surface a) between plate glass 106 and prism 107, passed through a collimator lens 109, reflected vertically by a 45° mirror 110, and collected onto a magneto-optical disk (not shown) as an optical recording medium by an objective lens 111. The beam reflected by the magneto-optical disk passes through objective lens 111, 45° mirror 110 and collimator lens 109 and enters beam splitter 108, where the beam is split into a beam 112 for detecting a servo error signal and a beam 113 for detecting a magneto-optical signal. Beam 112 for detecting a servo error signal enters from beam splitter 108 to hologram 105, where the beam is diffracted, guided by receiving optics 114, and detected as a servo error signal. Meanwhile, beam 113 for detecting a magneto-optical signal is reflected by a mirror surface on a rear surface (surface b) of plate glass 106 forming beam splitter 108, and guided to a coupler portion of an optical waveguide device 115 without passing through hologram 105. The beam coupled to the optical waveguide at this coupler portion is diffracted and divided into a TE (Transverse Electric field) wave and a TM (Transverse Magnetic field) wave in the optical waveguide, guided to an optical detector, and detected as a magneto-optical signal.

Receiving optics 114 and optical waveguide device 115 are fixed on stem 101 by adhesion, housed together with semiconductor laser 102 in one package, and sealed with a cap 116 in an airtight manner. Generally, the position and angle of incidence have to be strictly adjusted to couple a laser beam to an optical waveguide device.

Figure 2:
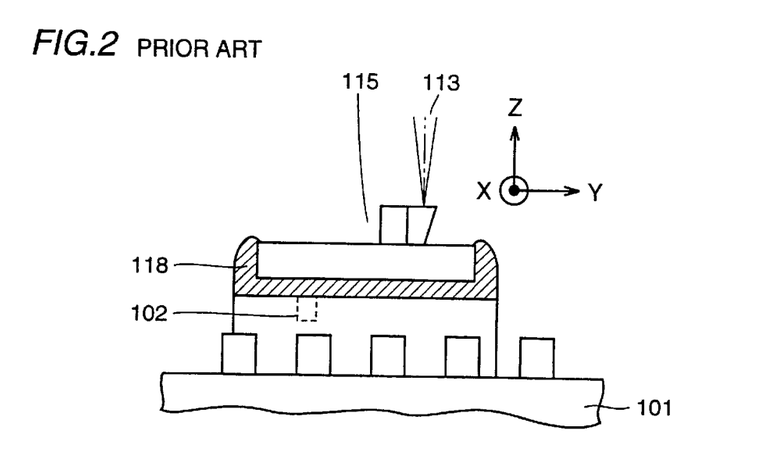
FIG. 2 is a plan view showing an optical waveguide device in an assembled state in the conventional optical pickup.

FIG. 2 is a view for illustrating positional adjustment and assembling of the optical waveguide device in the above described optical pickup.

The operation for adjusting the position of optical waveguide device 115 is performed for correctly coupling beam. 113 for detecting a magneto-optical signal to optical waveguide device 115. Optical waveguide device 115 is held so that the relative position of optical waveguide device 115 with respect to semiconductor laser 102 comes to have a prescribed position, and the position of optical waveguide device 115 is adjusted in three-dimensional directions of an optical axis direction Z and directions X and Y orthogonal to the optical axis. After the positional adjustment of optical waveguide device 115 is completed, optical waveguide device 115 is fixed on stem 101 by filling an adhesive 118 in a gap between optical waveguide device 115 and stem 101 while optical waveguide device 115 is held. Taking account of variation in the position for fixing semiconductor laser 102 and variation in the substrate thickness of optical waveguide device 115, the gap is set to at least 100 μm in a normal state so that a variable range for adjustment can be set in optical axis direction Z.

In the conventional optical pickup, however, the position of the optical waveguide device was adjusted in three-dimensional directions of an optical axis direction and directions orthogonal to the optical axis so as to couple a laser beam to the optical waveguide device, and an adhesive was filled in such a gap between the optical waveguide device and the stem that was caused after adjustment so as to fix the optical waveguide device on the stem. As a result, the relative position of the optical waveguide device with respect to the semiconductor laser was offset by shrinkage of the adhesive when it was cured and expansion or shrinkage of the adhesive when temperature changed in the environment where the optical pickup was used. As a result, the laser beam was less likely to be coupled and, in the worst case, the laser beam was not coupled at all and reliability in the environment could not be achieved sufficiently.

After the position of the optical waveguide device was adjusted in three-dimensional directions of an optical axis direction and directions orthogonal to the optical axis, the adhesive was filled in the gap between the optical waveguide device and the stem. Accordingly, the gap between the optical waveguide device and the stem was varied by variation in the position for fixing the semiconductor laser, variation in the substrate thickness of the optical waveguide device, and so on. As a result, the amount of applying the adhesive was not enough to achieve sufficient strength for fixing, or the amount of applying the adhesive was excessive and the adhesive flowed to the surface of the optical waveguide device, reducing the efficiency of detecting a laser beam. Especially, when the optical waveguide device was to be held by sandwiching the side surfaces of the device, the adhesive flowed and attached to the device holding portion, preventing removal of the device. Thus, workability and productivity were lowered.

The optical waveguide device was a semiconductor device formed by laminating an optical waveguide layer on an silicon substrate on which an electric circuit and the like were formed. When the optical waveguide device was directly adhered on the stem, a photo-curing adhesive could not be used as an adhesive. When a heat-curing adhesive was used instead, the optical waveguide device was under thermal stress and therefore the optical characteristics of the optical waveguide device changed or degraded. When an anaerobe adhesive was used, the time for adjusting the position of the optical waveguide device was limited.

Since electric insulation of the optical waveguide device from the semiconductor laser and the receiving optics was unreliable, the optical waveguide device was influenced by other circuits, and the S/N ratio of a magneto-optical recording and reproducing signal was worsened.

SUMMARY OF THE INVENTION

An object of the present invention is to provide an optical pickup allowing easy and highly-precise positional adjustment of an optical waveguide device.

Another object of the present invention is to provide a method of manufacturing an optical pickup allowing easy and highly-precise positional adjustment of an optical waveguide device.

According to one aspect of the present invention, an optical pickup includes a light source, a stem that fixes the light source, an optical waveguide device that detects a beam emitted from the light source and reflected on a recording medium, a wedge-shaped device fixing member that fixes the optical waveguide device on the stem, and a conductive layer provided on the wedge-shaped device fixing member that connects a wire connected to an output terminal of the optical waveguide device and a wire connected to a lead of the stem.

The optical waveguide device is fixed on the stem with the wedge-shaped device fixing member interposed. Accordingly, the position of the optical waveguide device can be adjusted while the device is abutted against the wedge-shaped device fixing member. Therefore, the optical waveguide device can easily be moved in three-dimensional directions of an optical axis direction and directions orthogonal to the optical axis. Since the output terminal of the optical waveguide device is connected to the lead of the stem through the conductive layer, wire bonding can easily be performed even when the output terminal of the optical waveguide device is not parallel with the end surface of the stem lead.

According to another aspect of the present invention, an optical pickup includes a light source, a stem that fixes the light source, an optical waveguide device that detects a beam emitted from the light source and reflected on a recording medium, a wedge-shaped device fixing member that fixes the optical waveguide device on the stem, and a lead provided in the stem and having a surface parallel with an output terminal of the optical waveguide device.

The optical waveguide device is fixed on the stem with the wedge-shaped device fixing member interposed. Accordingly, the position of the optical waveguide device can be adjusted while the device is abutted against the wedge-shaped device fixing member. Therefore, the optical waveguide device can easily be moved in three-dimensional directions of an optical axis direction and directions orthogonal to the optical axis. Since the stem lead has the surface parallel with the output terminal of the optical waveguide device, wire bonding can easily be performed.

According to still another aspect of the present invention, a method of manufacturing an optical pickup includes the steps of applying an adhesive between an optical waveguide device and a wedge-shaped device fixing member, applying an adhesive between the wedge-shaped fixing member and a stem, adjusting the position of the optical waveguide device in three-dimensional directions of an optical axis direction and directions orthogonal to the optical axis by moving the wedge-shaped device fixing member, and fixing the optical waveguide device and the wedge-shaped device fixing member.

Since the optical waveguide device is moved in three-dimensional directions of an optical axis direction and directions orthogonal to the optical axis by moving the wedge-shaped device fixing member, the position of the optical waveguide device can easily be adjusted.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of an optical pickup according to the present invention and a method of manufacturing the same will be described in the following with reference to the figures.

Figure 3:
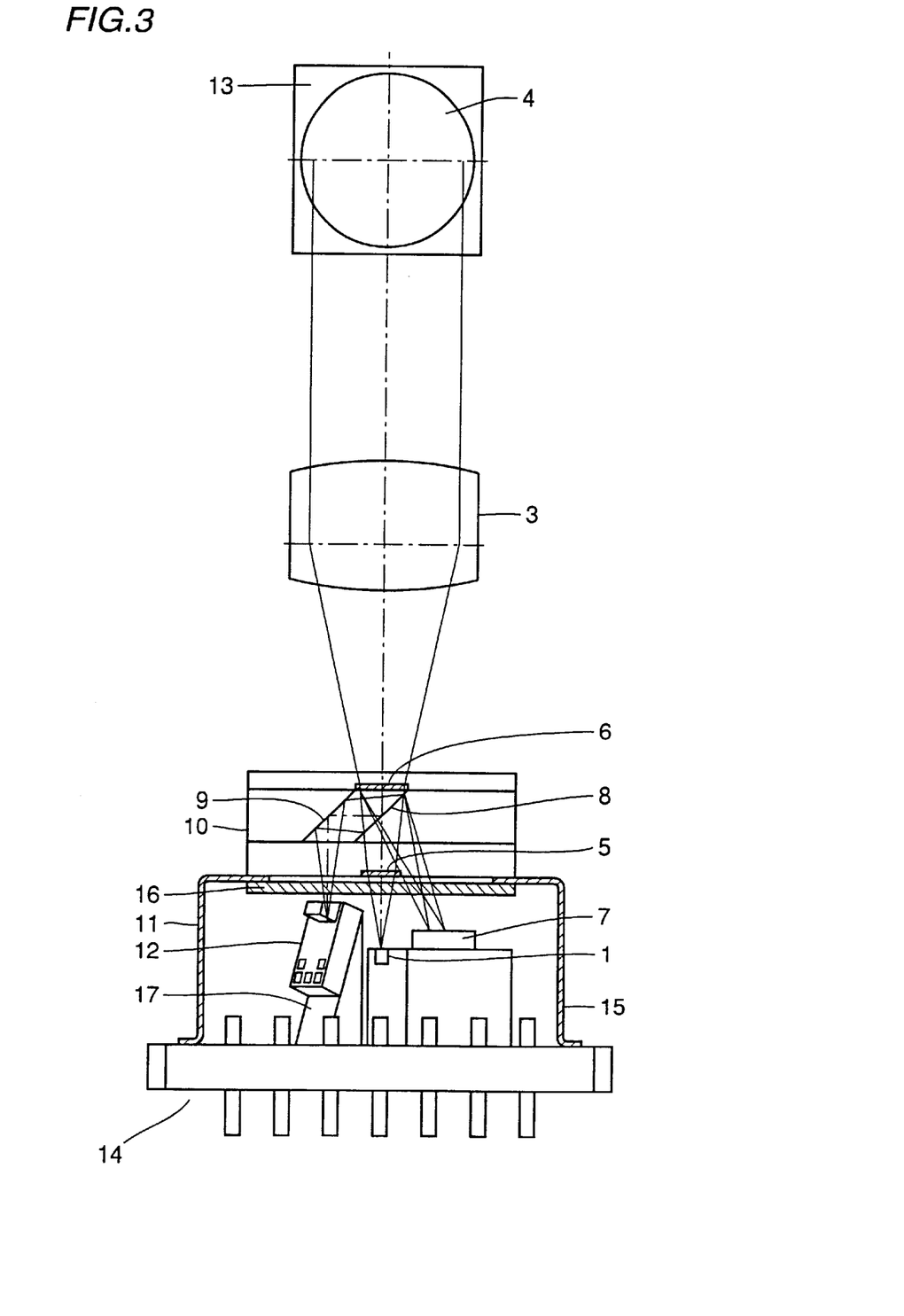
FIGS. 3 and 4 are plan and side views showing an embodiment of the optical pickup according to the present invention.
Figure 4:
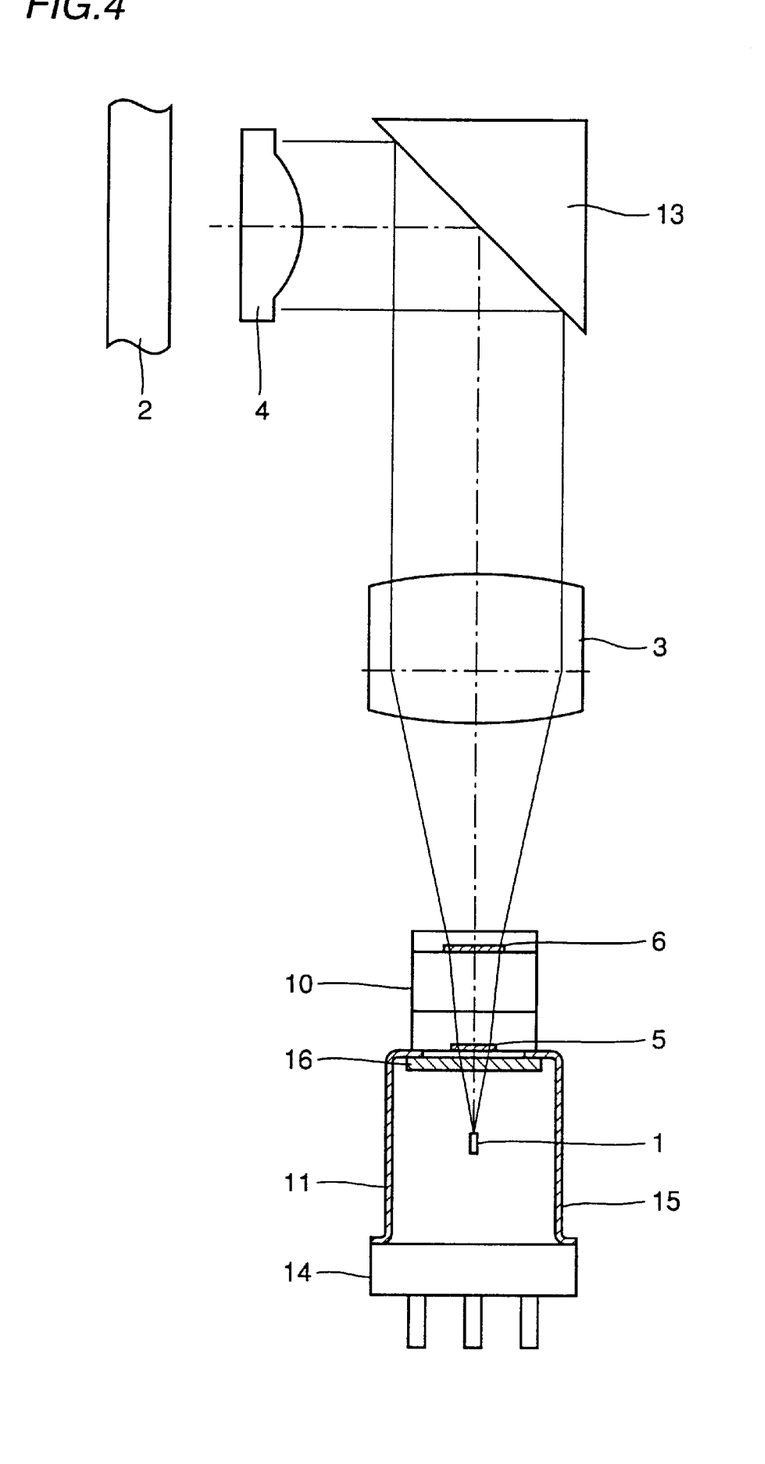

Referring to FIGS. 3 and 4, an optical pickup according to the present invention includes a semiconductor laser 1 as a light source, a collimator lens 3 and an objective lens 4 for collecting a light beam emitted from semiconductor laser 1 on a disk 2 as an optical recording medium, a grating 5 including a diffraction grating arranged on an optical path from semiconductor laser 1 to collimator lens 3 for dividing the light beam from semiconductor laser 1 into at least three light beams including a main beam and two tracking beams, a hologram 6 arranged on an optical path from grating 5 to collimator lens 3 for diffracting part of the beam reflected from disk 2, receiving optics 7 for detecting intensity of part of the beam reflected from disk 2 and diffracted by hologram 6, a beam splitter 10 having a first reflecting surface 8 arranged on an optical path from hologram 6 to grating 5 for reflecting part of the beam reflected from disk 2 and not diffracted by hologram 6 and a second reflecting surface 9 arranged in parallel with first reflecting surface 8 for reflecting again the beam reflected from reflecting surface 8, and an optical waveguide device 12 arranged together with semiconductor laser 1 in the same package 11 for detecting rotation of the plane of polarization of the light beam split by beam splitter 10. A 45° mirror 13 is arranged so as to change the direction of the beam from collimator lens 3 by 90°.

Package 11 includes a stem 14, a cap 15 and a cover glass 16. Semiconductor laser 1 and receiving optics 7 are directly arranged on stem 14. Optical waveguide device 12 is arranged on stem 14 with a device fixing member 17 interposed. Optical waveguide device 12 is arranged on stem 14 and rotated by 45° from semiconductor laser 1 so that it can have the polarization direction of ±45° with respect to the polarization direction of the beam collected on disk 2.

By using the optical waveguide device, integration, miniaturization and a lower cost of the receiving optics and an electric circuit such as a signal amplification circuit can be achieved.

The light beam emitted from semiconductor laser 1 is divided into three light beams by grating 5, and two tracking beam spots and one main beam spot are formed on disk 2 by collimator lens 3 and objective lens 4. The beam reflected by disk 2 passes again through objective lens 4 and collimator lens 3, and part of the reflected beam is refracted by hologram 6. The refracted beam passes through first reflecting surface 8, passes by the right side of grating 5, and it is detected as a servo error signal by receiving optics 7. Hologram 6 and receiving optics 7 have conventional shapes, and the servo error signal is detected according to the conventional principle.

Part of the light beam not diffracted by hologram 6 is reflected by first reflecting surface 8 of beam splitter 10, and almost all the beam is reflected by second reflecting surface 9. The beam from second reflecting surface 9 divided in this manner passes by the left side of grating 5, and it is coupled to optical waveguide device 12.

Figure 5:
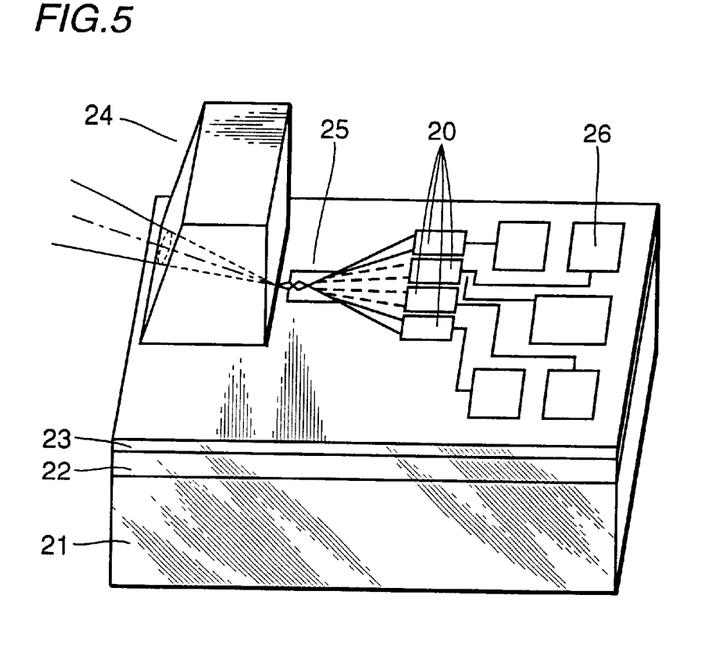
FIG. 5 is a perspective view showing an embodiment of the optical waveguide device used in the optical pickup according to the present invention.

As the optical waveguide device, the one shown in Japanese Patent Application No. 9-42711 (submitted on Feb. 26, 1997 and entitled "Optical Waveguide Type Mode Splitter") filed by the applicant can be utilized. The perspective view is shown in FIG. 5. Optical waveguide device 12 is formed by laminating a buffer layer 22 and an optical waveguide layer 23 on a silicon substrate 21 on which receiving optics 20, an electric circuit, not shown, and the like are formed, and adhering a coupler prism 24 to it. The beam split by beam splitter 10 is focused on coupler prism 24 and coupled to optical waveguide layer 23. The beam guided into the optical waveguide is divided by a polarizing and dividing element 25 into polarization components, that is, a TE beam and a TM beam. A magneto-optical signal is detected by receiving optics 20 and output as an electric signal from an output terminal 26.

The position and angle of incidence have to be strictly adjusted to couple a laser beam to the optical waveguide device. In the optical pickup according to the present invention, the relative position of optical waveguide device 12 with respect to semiconductor laser 1 is determined by the precision of the shape of beam splitter 10.

Positional adjustment of the optical waveguide device in manufacturing the optical pickup according to the present invention will be described in the following with reference to the side view shown in FIG. 6.

Figure 6:
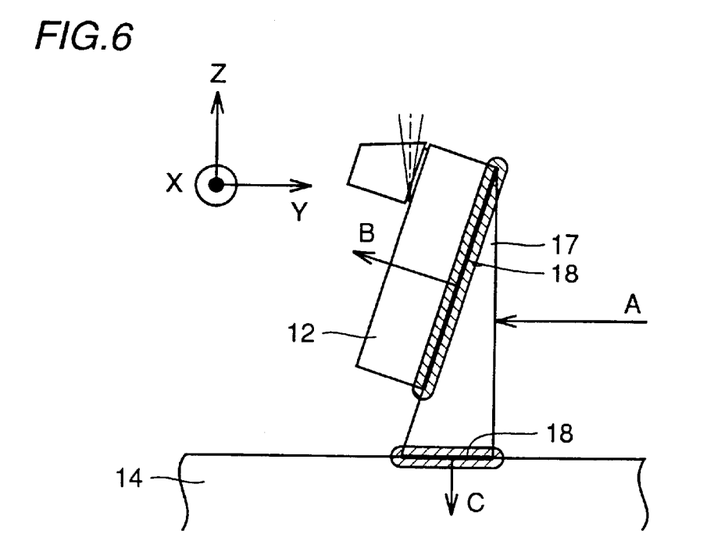
FIGS. 6 and 7 are side and plan views showing a method of manufacturing the optical waveguide device in the optical pickup according to the present invention.

As shown in FIG. 6, a wedge-shaped device fixing member 17 is used to adjust the position of optical waveguide device 12 and fix the device on stem 14.

In order to adjust the position of optical waveguide device 12, the position of the emission point of semiconductor laser 1 is first detected in position of the emission point of semiconductor laser 1 is first detected in three-dimensional directions of an optical axis direction and directions orthogonal to the optical axis. Then, optical waveguide device 12 is held so that the relative position of optical waveguide device 12 with respect to semiconductor laser 1 has a prescribed position. While device fixing member 17 is pressed in the direction of arrow A so that device fixing member 17 is always abutted against optical waveguide device 12 and stem 14, the position of optical waveguide device 12 is adjusted in three-dimensional directions of an optical axis direction Z and directions X and Y orthogonal to the optical axis. When positional adjustment of optical waveguide device 12 is completed, optical waveguide device 12 is held, and optical waveguide device 12 and device fixing member 17 as well as stem 14 and device fixing member 17 are fixed by adhesion while device fixing member 17 is pressed. By externally pressing device fixing member 17 so that device fixing member 17 is always abutted against optical waveguide device 12 and stem 14, optical waveguide device 12 and device fixing member 17 as well as stem 14 and device fixing member 17 are closely adhered. Therefore, the thickness of an adhesive 18 between optical waveguide device 12 and device fixing member 17 as well as between stem 14 and device fixing member 17 is made extremely thin.

By thus using wedge-shaped device fixing member 17, the thickness of adhesive 18 between optical waveguide device 12 and device fixing member 17 and between stem 14 and device fixing member 17 is made extremely thin. When temperature changes in the environment where the optical pickup is used, therefore, expansion or shrinkage of adhesive 18 can be reduced, the relative positional offset of optical waveguide device 12 with respect to semiconductor laser 1 can be restrained, and reliability in the environment can be improved.

Since the efficiency of coupling a laser beam to the optical waveguide generally greatly depends on the angle of incidence of the laser beam on the optical waveguide device, the angle of incidence of the laser beam on the optical waveguide device has to be strictly adjusted.

In the optical pickup according to the present invention, the optical waveguide device has to be inclined with respect to a laser beam so that the laser beam has an optimum angle of incidence to maximize the efficiency of coupling the laser beam to the optical waveguide.

Especially, when optical waveguide device 12 has to be arranged in an inclined manner as in this embodiment, highly-precise three-dimensional adjustment and fixing of the optical waveguide device in three-dimensional directions of an optical axis direction and directions orthogonal to the optical axis are very difficult. Since the end surface of a lead provided in a stem 14 and the wire bonding surface of optical waveguide device 12 are no longer parallel, the stem has to be rotated during operation so that respective wire bonding surfaces are horizontal in performing wire bonding of the lead of stem 14 and optical waveguide device 12. Therefore, the cost of manufacturing equipment is increased, and workability and productivity are lowered.

Accordingly, the wedge shape of device fixing member 17 is optimum and preferable to fix optical waveguide device 12 so that a laser beam has an optimum angle of incidence. When the slope of wedge-shaped device fixing member 17 is adjusted to the angle of incidence on optical waveguide device 12 and precisely processed, the angle of incidence does not have to be precisely adjusted in adjusting the position of optical waveguide device 12. Therefore, the time for adjustment can be shortened, workability and productivity can be improved, and a laser beam can be coupled reliably and stably to optical waveguide device 12. Since device fixing member 17 is of a wedge shape, force is applied in the direction of arrow B in optical waveguide device 12 and in the direction of arrow C in stem 14 when device fixing member 17 is pressed in the direction of arrow A to abut itself against optical waveguide device 12 and stem 14. Therefore, optical waveguide device 12 and device fixing member 17 as well as stem 14 and device fixing member 17 can be closely attached more reliably.

Therefore, the angle of incidence of a laser beam on optical waveguide device 12 can be adjusted stably and reliably, and the thickness of adhesive 18 between optical waveguide device 12 and device fixing member 17 and between stem 14 and device fixing member 17 can be made extremely thin.

When the size of optical waveguide device 12 is 2×3 mm, the angle of slope inclination of device fixing member 17 is 71°±0.2°, and the pressure to device fixing member 17 is 60 gf in this embodiment, it can be achieved that the thickness of adhesive 18 between optical waveguide device 12 and device fixing member 17 and between stem 14 and device fixing member 17 is 2 to 3 μm and the precision of the angle of incidence of a laser beam on optical waveguide device 12 is 71°±0.4°.

Figure 7:
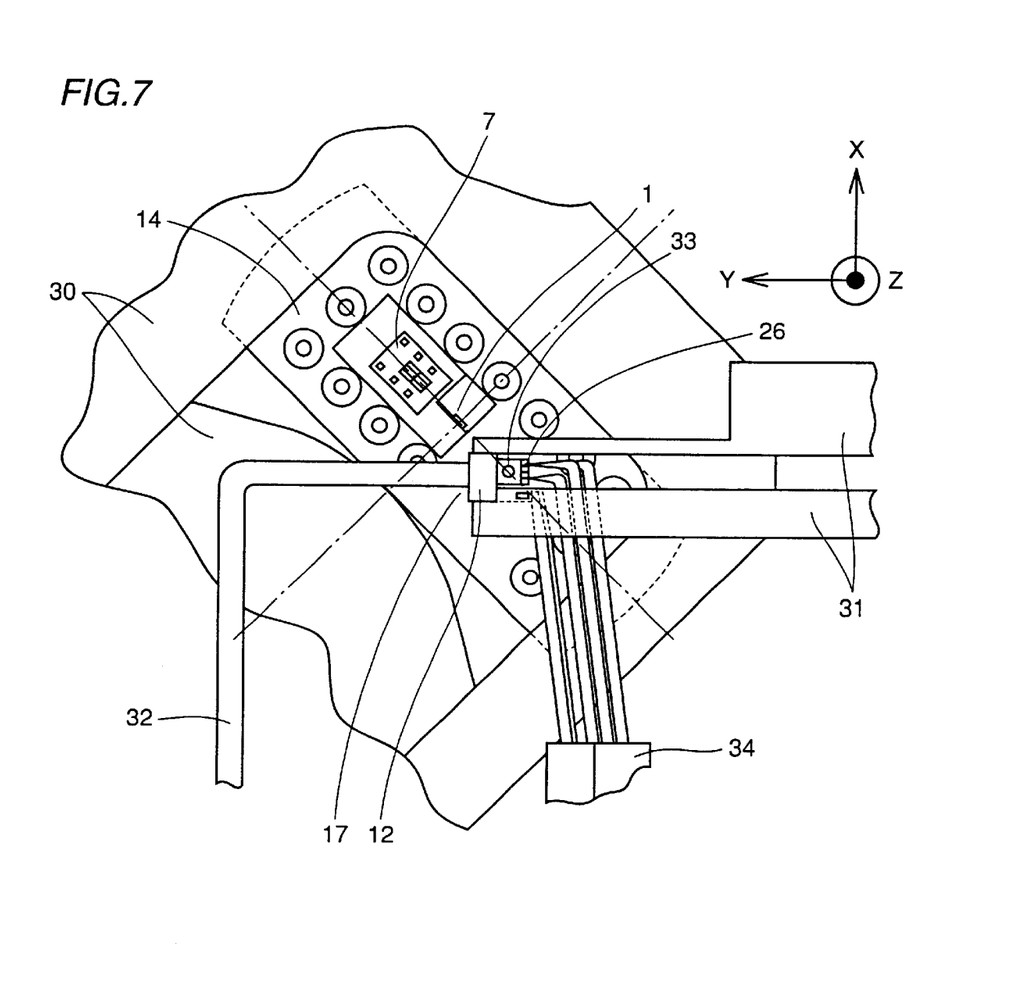

FIG. 7 shows a plan view of a jig for adjusting the position of the optical waveguide device in manufacturing the optical pickup according to the present invention. The jig includes a stem holding mechanism 30 for positioning and holding stem 14, a device holding mechanism 31 for holding optical waveguide device 12 by sandwiching the side surfaces of optical waveguide device 12, and a pressing mechanism 32 for pressing device fixing member 17 against optical waveguide device 12 and stem 14. Pressing mechanism 32 is a rod-shaped member bent at a right angle and has one end supported and the other end abutted against device fixing member 17. Device fixing member 17 is elastically supported by deflection of the rod-shaped member. Pressing mechanism 32 and device holding mechanism 31 are fixed on the same base (not shown), and pressing mechanism 32 moves together with device holding mechanism 31 in adjusting the position of optical waveguide device 12. When optical waveguide device 12 is to be adjusted in X and Y directions, device fixing member 17 smoothly moves integrally with optical waveguide device 12 on stem 14 while being abutted against optical waveguide device 12. Therefore, optical waveguide device 12 can be adjusted easily and precisely in X and Y directions.

When device fixing member 17 has a wedge shape, device fixing member 17 is pressed and elastically supported by pressing mechanism 32 so that device fixing member 17 is abutted against optical waveguide device 12 and stem 14. Accordingly, optical waveguide device 12 can be adjusted easily and precisely in Z direction by smoothly moving, on stem 14, device fixing member 17 in negative Y direction when optical waveguide device 12 is to be adjusted in positive Z direction and device fixing member 17 in positive Y direction when optical waveguide device 12 is to be adjusted in negative Z direction.

Preferably, adhesive 18 for fixing optical waveguide device 12 to device fixing member 17 and device fixing member 17 to stem 14 is applied before adjusting the position of optical waveguide device 17. The position of optical waveguide device 12 is adjusted while device fixing member 17 is externally pressed so that device fixing member 17 is always abutted against optical waveguide device 12 and stem 14. Accordingly, friction between optical waveguide device 12 and device fixing member 17 and between stem 14 and device fixing member 17 increases, and therefore the movement, that is, responsiveness of optical waveguide device 12 during adjustment decreases. Thus, highly-precise adjustment is difficult. When adhesive 18 is applied between optical waveguide device 12 and device fixing member 17 and between stem 14 and device fixing member 17 before adjusting the position of optical waveguide device 17, however, the adhesive serves as lubricant. Therefore, the friction between optical waveguide device 12 and device fixing member 17 and between stem 14 and device fixing member 17 can be reduced, the responsiveness of optical waveguide device 12 during adjustment can be improved. Thus, highly-precise adjustment can be achieved.

Figure 8:
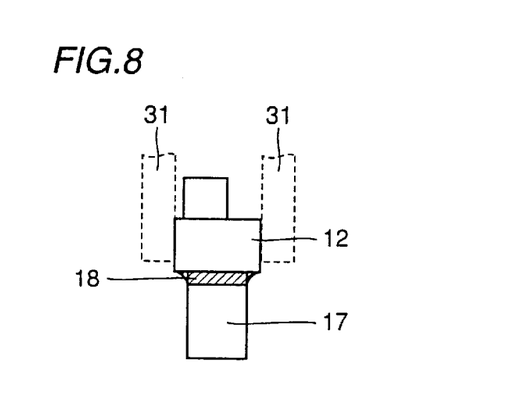
FIG. 8 shows an example of the state of the optical waveguide device fixed by adhesion in the optical pickup according to the present invention.
Figure 9:
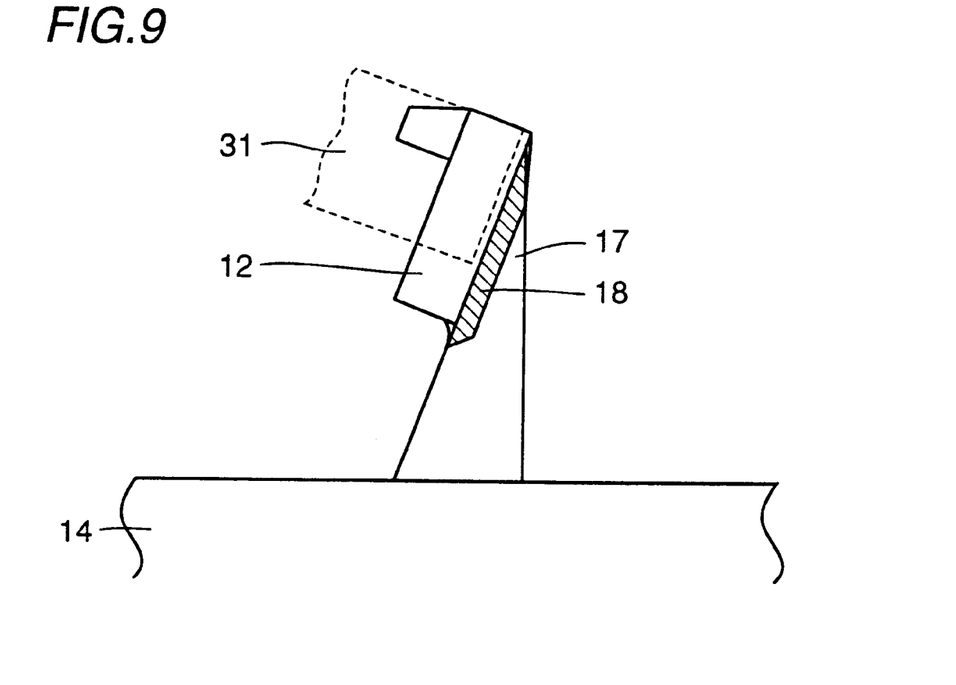
FIG. 9 is a side view showing one embodiment of the state of the optical waveguide device fixed by adhesion in the optical pickup according to the present invention.

FIGS. 8 and 9 are one embodiment of the state of the optical waveguide device fixed by adhesion. FIGS. 8 and 9 are an end view and a side view thereof. When the relative position of optical waveguide device 12 with respect to semiconductor laser 1 comes to have a prescribed position, optical waveguide device 12 is protruded from device fixing member 17 as shown in FIG. 9. In this embodiment, the amount of applying adhesive 18 between optical waveguide device 12 and device fixing member 17 is suitably about 0.1 mm$^3$. Since optical waveguide device 12 is fixed by adhesion while being protruded from device fixing member 17, the danger that adhesive 18 flows to the upper surface and the side surfaces of optical waveguide device 12 is prevented compared with the case where optical waveguide device 12 is not protruded, and the efficiency from lowering due to the effect of flowed adhesive 18. When device holding mechanism 31 for sandwiching the side surfaces of the optical waveguide device is used as a mechanism for holding optical waveguide device 12, the protruded portions of optical waveguide device 12 from device fixing member 17 are held. Thus, the danger that adhesive 18 flows and attaches to device holding mechanism 31 is prevented, and workability and productivity are improved.

Figure 10:
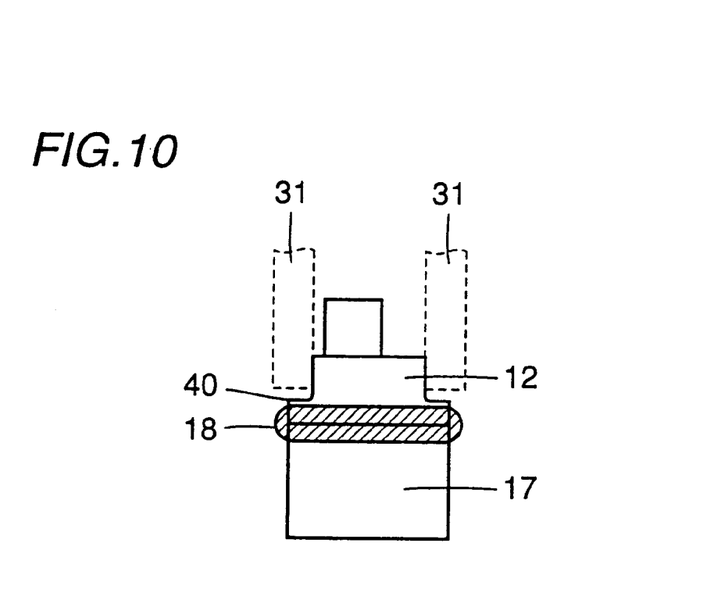
FIG. 10 shows another embodiment of the state of the optical waveguide device fixed by adhesion in the optical pickup according to the present invention.

FIG. 10 is an end view showing another embodiment of the state of the optical waveguide device fixed by adhesion. A step portion 40 is formed at an end surface of optical waveguide device 12. When the optical waveguide device of a prescribed size is cut out from a substrate, step portion 40 can be formed, for example, by, using a device such as a dicer, leaving part of the substrate without completely cutting the substrate in a "half-cut" manner and then completely cutting the outside. By forming step portion 40 at the end surface of optical waveguide device 12, the danger that adhesive 18 flows to the upper surface of optical waveguide device 12 is prevented in fixing optical waveguide device 12 on device fixing member 17 by adhesion, and the efficiency of detecting a laser beam of optical waveguide device 12 can be prevented from lowering due to the effect of flowed adhesive 18. When device holding mechanism 31 for sandwiching the side surfaces of the optical waveguide device is used as a mechanism for holding optical waveguide device 12, the danger that adhesive 18 flows and attaches to device holding mechanism 31 is prevented and productivity and workability are improved by holding step portion 40 provided at optical waveguide device 12.

A light transmitting material such as glass and transparent resin is used for device fixing member 17. When the light transmitting material is used for device fixing member 17, a photo-curing adhesive can be used to adhere optical waveguide device 12 to device fixing member 17 and device fixing member 17 to stem 14. When light is directed after completion of positional adjustment of optical waveguide device 12 in three-dimensional directions of an optical axis direction and directions orthogonal to the optical axis, therefore, optical waveguide device 12 and device fixing optical axis, therefore, optical waveguide device 12 and device fixing member 17 can be fixed on stem 14 instantaneously and simultaneously. When the photo-curing adhesive is used, optical waveguide device 12 is not subjected to thermal stress, such a limitation of the time for positional adjustment of the device as caused when an anaerobe adhesive is used is prevented, and the time for adjustment can be ensured. When a glass material is used for device fixing member 17, optical waveguide device 12 can be electrically insulated reliably from semiconductor laser 1, receiving optics 7, and the like. As a result, the degree of freedom for designing an electric circuit connected to the optical pickup increases, and at the same time the influence of other circuits reduces. Thus, a magneto-optical reproducing signal with a superior S/N ratio is obtained.

When optical waveguide device 12 is arranged in an inclined manner as in this embodiment, the end surface of a lead provided in stem 14 is not parallel with a wire bonding surface of the optical waveguide device. In wire bonding the lead of stem 14 and optical waveguide device 12, stem 14 has to be rotated so that wire bonding surfaces are horizontal. Thus, the cost of manufacturing equipment is increased, and workability and productivity are lowered.

Figure 11:
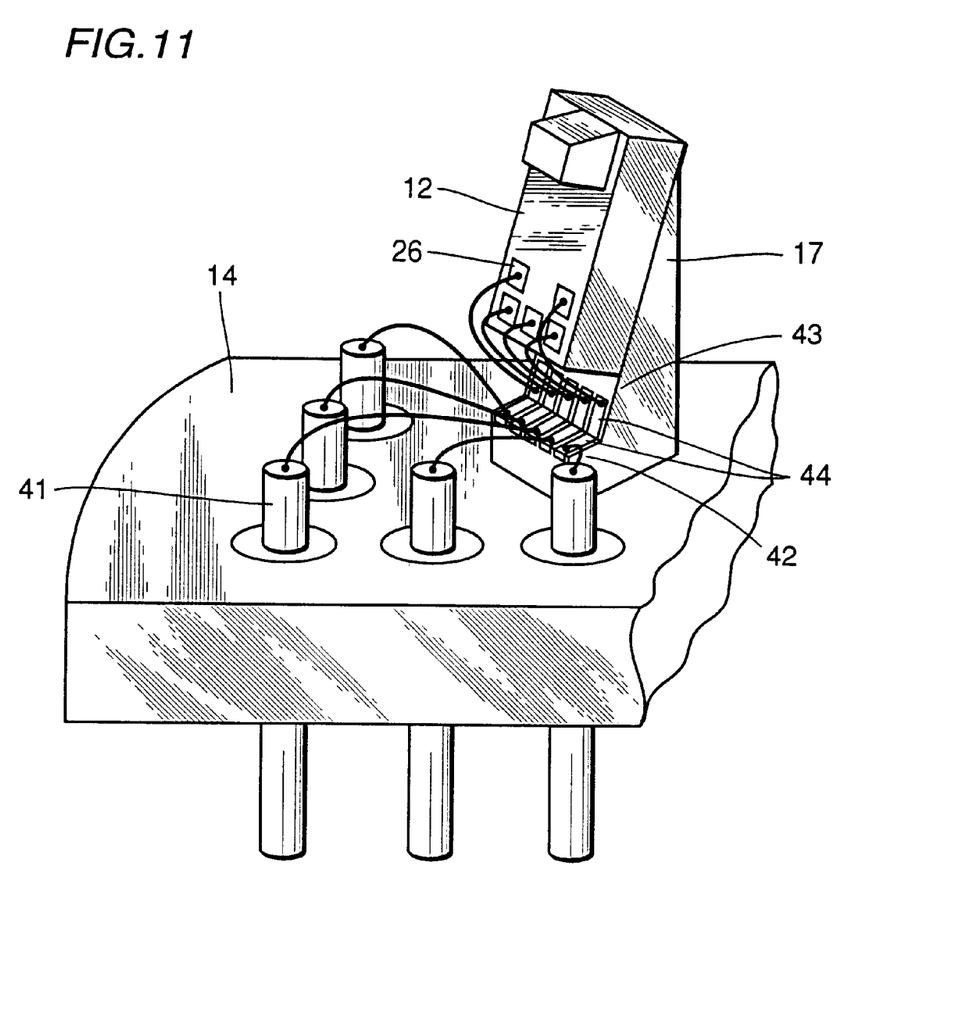
FIG. 11 is a perspective view showing one embodiment of wire bonding of the optical waveguide device and a stem lead in the optical pickup according to the present invention.

FIG. 11 is a perspective view showing one embodiment of wire bonding of optical waveguide device 12 arranged in an inclined manner and a lead of stem 14 in the optical pickup according to the present invention. A surface 42 parallel with the end surface of lead 41 of stem 14 is formed at part of device fixing member 17, and a conductive layer 44 from a surface 43 for fixing optical waveguide device 12 to the parallel surface 42 is provided. An output terminal 26 of optical waveguide device 12 and the conductive layer formed on surface 43 for fixing optical waveguide device 12 are connected by a wire, and the conductive layer linked to the above-described conductive layer on surface 43 and parallel with the end surface of lead 41 of stem 14 and the end surface of lead 41 of stem 14 are connected by a wire. The conductive layer of device fixing member 17 can be formed, for example, by using a resin material for device fixing member 17 and shaping device fixing member 17 with a conductive layer material arranged at a prescribed position in advance. The conductive layer can be formed by "insert shaping." In addition, the conductive layer can be formed by using a glass material for device fixing member 17, forming a film of a conductive material on the surface of device fixing member 17, and removing part of the formed film. When surface 42 parallel with the end surface of lead 41 of stem 14 is formed at part of device fixing member 17, and conductive layer 44 from surface 43 for fixing optical waveguide device 12 to parallel surface 42 is provided, wire bonding of optical waveguide device 12 arranged in an inclined manner and lead 41 of stem 14 is allowed, workability and productivity of wire bonding can be improved, and an increase in the cost of manufacturing equipment can be restrained.

Figure 12:
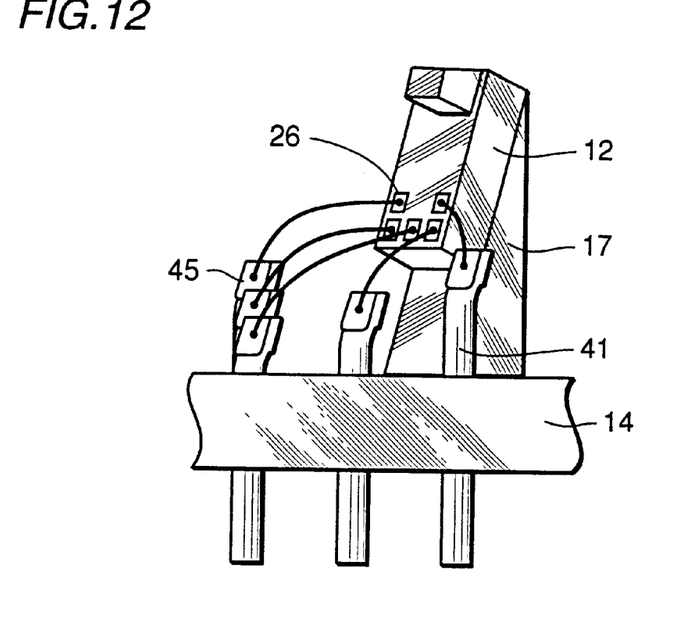
FIGS. 12 and 13 are plan views showing other embodiments of wire bonding of the optical waveguide device and a stem lead in the optical pickup according to the present invention.
Figure 13:
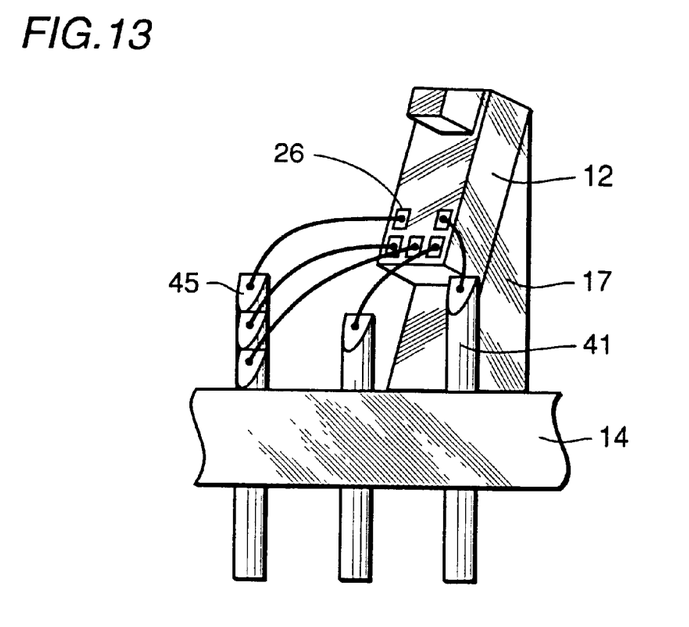

FIGS. 12 and 13 are plan views showing other embodiments of wire bonding of optical waveguide device 12 arranged in an inclined manner and a lead of stem 14. In FIGS. 12 and 13, a surface 45 parallel with optical waveguide device 12 is formed on lead 41 of stem 14, and output terminal 26 of optical waveguide device 12 and surface 45 formed on lead 41 of stem 14 and parallel with optical waveguide device 12 are connected by a wire. Surface 45 parallel with optical waveguide device 12 can be formed on lead 41 of stem 14 by bending the tip of lead 41 in parallel with optical waveguide device 12 and crushing the tip of the lead as shown in FIG. 12. The surface can also be formed by cutting the end surface of lead 41 in parallel with optical waveguide device 12 as shown in FIG. 13. When surface 45 parallel with optical waveguide device 12 is formed on lead 41 of stem 14, wire bonding of optical waveguide device 12 arranged in an inclined manner and lead 41 of stem 14 is allowed, workability and productivity of wire bonding can be improved, and an increase in the cost of manufacturing equipment can be restrained.

The position to which waveguide device 12 is to be adjusted is detected by providing another semiconductor laser (not shown) correctly adjusted to collect a beam at a prescribed position with respect to the position of the emission point of semiconductor laser 1 fixed on stem 14, and using the output of optical waveguide device 12 for the collected laser beam 33. The output of optical waveguide device 12 is detected by abutting a probe 34 fixed on the same base (not shown) on which device holding mechanism 31 is fixed and moving together with device holding mechanism 31 against output terminal 26 of optical waveguide device 12. If the holding force of holding device holding mechanism 31 is small in abutting probe 34 against output terminal 26 of optical waveguide device 12, optical waveguide device 12 may be displaced in positive Y direction. Since optical waveguide device 12 is always pressed in negative Y direction by sufficient force of pressing mechanism 32 with device fixing member 17 interposed in the method of adjusting the position of the optical waveguide device, however, optical waveguide device 12 will not be displaced. In this embodiment, the force of abutting the probe against the optical waveguide device is 60 gf, and the pressure to device fixing member 17 by pressing mechanism 32 is 100 gf. In adjusting the position of optical waveguide device 12, the position of optical waveguide device 12 is adjusted in three-dimensional directions of optical axis direction Z and directions X and Y orthogonal to the optical axis so that the output of optical waveguide device 12 for laser beam 33 is maximum and the balance of the outputs of two pairs of receiving optics 20 is equalized. When the semiconductor laser adjusted to collect laser beam 33 at a prescribed position is provided for the position of the emission point of semiconductor laser 1 fixed on stem 14, and probe 34 abutted against output terminal 26 of optical waveguide device 12 is provided for device holding mechanism 31, the position to which optical waveguide device 12 is to be adjusted can be detected from the output of optical waveguide device 12 for laser beam 33. Thus, the position of optical waveguide device 12 can be adjusted more correctly and precisely.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup, comprising:
   a light source;
   a stem on which said light source is fixed;
   an optical waveguide device that detects a beam emitted from said light source and reflected on a recording medium;

a wedge-shaped device fixing member that is placed between said optical waveguide device and said stem; and a conductive layer provided on said wedge-shaped device fixing member that connects a wire connected to an output terminal of said optical waveguide device and a wire connected to a lead of said stem.

2. The optical pickup according to claim 1, wherein said conductive layer includes a surface parallel with the output terminal of said optical waveguide device and a surface parallel with an end surface of the lead of said stem.

3. The optical pickup according to claim 1, wherein said wedge-shaped device fixing member is formed of an optically transparent material.

4. The optical pickup according to claim 3, wherein said optically transparent material is glass or transparent resin.

5. A method of manufacturing an optical pickup, comprising the steps of:

applying an adhesive between an optical waveguide device and a wedge-shaped device fixing member;

applying an adhesive between said wedge-shaped device fixing member and a stem;

adjusting a position of said optical waveguide device in three-dimensional directions of an optical axis direction and directions orthogonal to the optical axis by moving said wedge-shaped device fixing member and said optical waveguide device; and fixing said optical waveguide device and said wedge-shaped device fixing member.

6. The method of manufacturing an optical pickup according to claim 5, wherein the step of adjusting a position of said optical waveguide device includes the steps of holding said optical waveguide device, and pressing said wedge-shaped device fixing member to be abutted against said optical waveguide device and said stem.

7. The method of manufacturing an optical pickup according to claim 6, wherein the step of adjusting a position of said optical waveguide device further includes the steps of setting a semiconductor laser so that a laser beam is collected at a prescribed position, detecting said collected laser beam by said optical waveguide device, and moving said wedge-shaped device fixing member according to the detection result of said optical waveguide device.

8. The method of manufacturing an optical pickup according to claim 6, wherein the step of holding said optical waveguide device is for holding said optical waveguide device so that said optical waveguide device is protruded from said wedge-shaped device fixing member.

9. The method of manufacturing an optical pickup according to claim 6, wherein the step of holding said optical waveguide device is for holding a step portion provided at said optical waveguide device.

10. The method of manufacturing an optical pickup according to claim 5, wherein the adhesive applied between said optical waveguide device and said wedge-shaped device fixing member and the adhesive applied between said wedge-shaped device fixing member and said stem are a photo-curing adhesive.

11. The method of manufacturing an optical pickup, according to claim 5, wherein said wedge-shaped device fixing member is formed of an optically transparent material.

12. The method of manufacturing an optical pickup, according to claim 11, wherein said optically transparent material is glass or transparent resin.

* * * * *